(12) United States Patent
Chang et al.

(10) Patent No.: US 11,578,692 B2
(45) Date of Patent: Feb. 14, 2023

(54) TIDAL POWER GENERATION DEVICE AND CONTAINER ASSEMBLY FOR ACCOMMODATING POWER GENERATION DEVICE

(71) Applicant: Hung-Sen Chang, Miaoli County (TW)

(72) Inventors: Hung-Sen Chang, Miaoli County (TW); Chih-Ho Fan, Miaoli County (TW)

(73) Assignee: Hung-Sen Chang, Miaoli County (TW)

( * ) Notice: Subject to any disclaimer, the term of this patent is extended or adjusted under 35 U.S.C. 154(b) by 60 days.

(21) Appl. No.: 17/208,119

(22) Filed: Mar. 22, 2021

(65) Prior Publication Data
US 2022/0243698 A1 Aug. 4, 2022

(30) Foreign Application Priority Data
Feb. 4, 2021 (TW) .................................. 110104278

(51) Int. Cl.
*F03B 13/26* (2006.01)
*F03B 11/02* (2006.01)
*F03B 11/00* (2006.01)

(52) U.S. Cl.
CPC ............ *F03B 13/26* (2013.01); *F03B 11/004* (2013.01); *F03B 11/02* (2013.01); *F05B 2220/706* (2013.01)

(58) Field of Classification Search
CPC ........ F03B 13/26; F03B 11/004; F03B 11/02; F05B 2220/706
USPC ..................................................... 290/42, 53
See application file for complete search history.

(56) References Cited

U.S. PATENT DOCUMENTS

| | | | | |
|---|---|---|---|---|
| 5,426,332 A | * | 6/1995 | Ullman | F03B 13/262 417/334 |
| 2008/0088132 A1 | * | 4/2008 | Laube von Laubenfels | F03B 13/14 290/53 |
| 2008/0303284 A1 | * | 12/2008 | Clemens | F03B 17/066 290/43 |
| 2011/0309624 A1 | * | 12/2011 | Ettanoor Thuppale | F03B 3/18 415/1 |

(Continued)

FOREIGN PATENT DOCUMENTS

| | | | | |
|---|---|---|---|---|
| DE | 202010001796 U1 | * | 7/2010 | ............ F03B 17/061 |
| WO | WO-2008050149 A1 | * | 5/2008 | ............ F03B 13/264 |
| WO | WO-2018071963 A1 | * | 4/2018 | ............... E02B 9/08 |

*Primary Examiner* — Charles Reid, Jr.
(74) *Attorney, Agent, or Firm* — Rosenberg, Klein & Lee

(57) ABSTRACT

A tidal power generation device includes a container assembly and a power generation device arranged in the container assembly. A water inlet of the container assembly allows a tidal water flow to enter. An entrance guide plate of the container assembly causes the water flow to advance in the direction of the power generation device to push the power generation device's thrust plates, and thereby driving the power generation device's thrust plate traction mechanism to make a power generator of the power generation device convert kinetic energy into electrical energy. After the water flow pushes the thrust plates, it enters a pressure accumulating pool of the container assembly. Then, the water flow in the pressure accumulating pool flows to a backflow guide plate of the container assembly, and flows to a first pressure relief pool of the container assembly to continue pushing the thrust plates.

18 Claims, 12 Drawing Sheets

(56) References Cited

U.S. PATENT DOCUMENTS

| | | | |
|---|---|---|---|
| 2014/0356139 A1* | 12/2014 | Hall | F03B 11/004 |
| | | | 415/151 |
| 2016/0084219 A1* | 3/2016 | Owen | F03B 3/12 |
| | | | 415/1 |
| 2021/0156355 A1* | 5/2021 | Kumwenda | F03B 17/005 |
| 2021/0246866 A1* | 8/2021 | Blodgett | H02K 7/1004 |
| 2022/0136479 A1* | 5/2022 | Park | F03B 11/06 |
| | | | 415/229 |

* cited by examiner

TIDAL POWER GENERATION DEVICE AND CONTAINER ASSEMBLY FOR ACCOMMODATING POWER GENERATION DEVICE

TECHNICAL FIELD

The present disclosure relates to a tidal power generation device, and particularly relates to a tidal power generation device and a container assembly for accommodating power generation device that can protect thrust plates from damage due to excessive water flow thrust.

RELATED ART

At present, people's awareness of environmental protection is gradually increasing, and some governments are pushing clean green power generation. Therefore, in addition to wind and solar power generation, tidal power generation is gradually being valued. Tidal power generation is a form of hydroelectric power generation that uses the movement of the tidal water flow or the rise and fall of the tidal sea surface to obtain energy. Although it has not been widely used at present, the tidal power generation has great potential for future power supply. In addition, compared to the wind power and solar power, the tidal power generation is easier to predict, so it is more suitable for power dispatch.

There are two main forms of the tidal power generation, one is tidal current power generation, and the other is barrage-type power generation. The tidal current power generation uses a tidal water flow to drive thrust plates to make a power generator of a power generation device convert kinetic energy into electrical energy. The barrage-type power generation converts the potential energy of the tidal water level into electrical energy. The barrage-type power generation will have a greater impact on the ecology, so the tidal current power generation is mostly used. However, the thrust plates used in the tidal current power generation are prone to damage due to excessive water flow thrust, resulting in higher maintenance costs.

SUMMARY OF THE PRESENT DISCLOSURE

To solve the above-mentioned problems of the prior art, the objective of the present disclosure is to provide a tidal power generation device, which can protect thrust plates from damage due to excessive water flow thrust. In addition, the present disclosure also provides a container assembly for accommodating power generation device.

According to an objective of the present disclosure, the present disclosure provides a tidal power generation device which comprises a container assembly and a power generation device. The container assembly at least comprises an inlet wave height adjustment plate, at least an entrance guide plate, two ocean current side guide plates and a backflow guide plate, wherein the inlet wave height adjustment plate is disposed on a first side of the container assembly, the two ocean current side guide plates are respectively disposed on a second side and a third side of the container assembly, the first side is disposed adjacent to the second side and the third side, the backflow guide plate is disposed on a fourth side of the container assembly and disposed between the two ocean current side guide plates, the first side faces the fourth side, and the entrance guide plate is diagonally disposed in the container assembly. The power generation device comprises thrust plates, wherein the power generation device is disposed between the first side and the fourth side and disposed on one side of the entrance guide plate. The inlet wave height adjustment plate is used to move vertically to adjust a water inlet amount of a water flow of a water inlet associated with the container assembly, the entrance guide plate is used to guide the water flow to push the thrust plates, the backflow guide plate is used to guide the water flow that pushes the thrust plates to push the thrust plates again, and a region formed by a position which the container assembly accommodates the power generation device, the entrance guide plate and the ocean current side guide plate defines a first pressure relief pool of the container assembly.

According to the above technical features, the backflow guide plate is provided with at least one unidirectional valve, and when a water flow thrust of a pressure accumulating pool defined between the backflow guide plate, the position of the power generation device and the second side is greater than a first specific value, the unidirectional valve is turned on to guide the water flow of the pressure accumulating pool to a second pressure relief pool defined between the backflow guide plate, the position of the power generation device and the third side.

According to the above technical features, the container assembly further comprises two backflow side guide plates, one of the backflow side guide plate is diagonally disposed between the second side and the backflow guide plate, and the other one backflow side guide plate is diagonally disposed between the third side and the backflow guide plate.

According to the above technical features, the container assembly further comprises an outlet wave height adjustment plate disposed on a side of the backflow guide plate that is not facing the power generation device and disposed between the second side and the third side, and the outlet wave height adjustment plate is used to move vertically to adjust a water outlet amount of the water flow of a water outlet associated with the container assembly.

According to the above technical features, a summation of a first angle and a second angle is between 60 and 120 degrees, the first angle is formed between the entrance guide plate and a normal line of the water inlet of the container assembly, and the second angle is formed between the ocean current side guide plate of the second side and the normal line.

According to the above technical features, one end of the entrance guide plate does not contact the inlet wave height adjustment plate and the ocean current side guide plate of the third side.

According to the above technical features, one end of the entrance guide plate contacts the inlet wave height adjustment plate, and the ocean current side guide plate of the third side does not contact the inlet wave height adjustment plate, thereby forming another water outlet of the container assembly.

According to the above technical features, one end of the entrance guide plate contacts the inlet wave height adjustment plate, and protrudes out of the inlet wave height adjustment plate, and the ocean current side guide plate of the third side does not contact the inlet wave height adjustment plate, thereby forming another water outlet of the container assembly, wherein the entrance guide plate is protruding beyond the other one water outlet.

According to the above technical features, the at least one inlet wave height adjustment plate comprises two inlet wave height adjustment plates, the at least one entrance guide plate comprises two entrance guide plates, and the two inlet wave height adjustment plates are located on the first side, the two entrance guide plates are diagonally disposed in the container assembly, and each of the two entrance guide plates has at least one unidirectional valve, so that when the water flow thrust is greater than a third specific value, the water flow flows to the thrust plates through the unidirectional valve.

According to the above technical features, the container assembly further comprises an ascending guide plate being ramp-shaped, and the ascending guide plate is arranged between the position of the power generation device and the two entrance guide plates.

According to the above technical features, the container assembly further comprises a backflow exit gate plate, the backflow exit gate plate is disposed between the backflow guide plate and the ocean current side guide plate on the third side, the backflow exit gate plate has the at least one unidirectional valve, so that when the water flow thrust is greater than a fourth specific value, the water flow flows out of a water outlet of the container assembly.

According to the above technical features, a height of the position of the power generation device is greater than a height of a pressure relief pool which is defined between the backflow exit gate plate, the position of the power generation device and the ocean current side guide plate on the third side.

According to the above technical features, the power generation device has multiple dampers, and each of the thrust plates is pivotally connected to the at least one damper, so that when the water flow thrust is greater than a second specific value, an angle between the thrust plate and a horizontal plane is changed.

According to a fifth embodiment of the present disclosure, the present disclosure provides a container assembly of a tidal power generation device for accommodating a power generation device, wherein the container assembly can be arbitrary one mentioned container assembly.

In summary, the container assembly of the tidal power generation device of the embodiment of the present disclosure can protect the thrust plate from damage due to excessive water flow thrust, and still has good power generation efficiency, so it can reduce maintenance costs.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
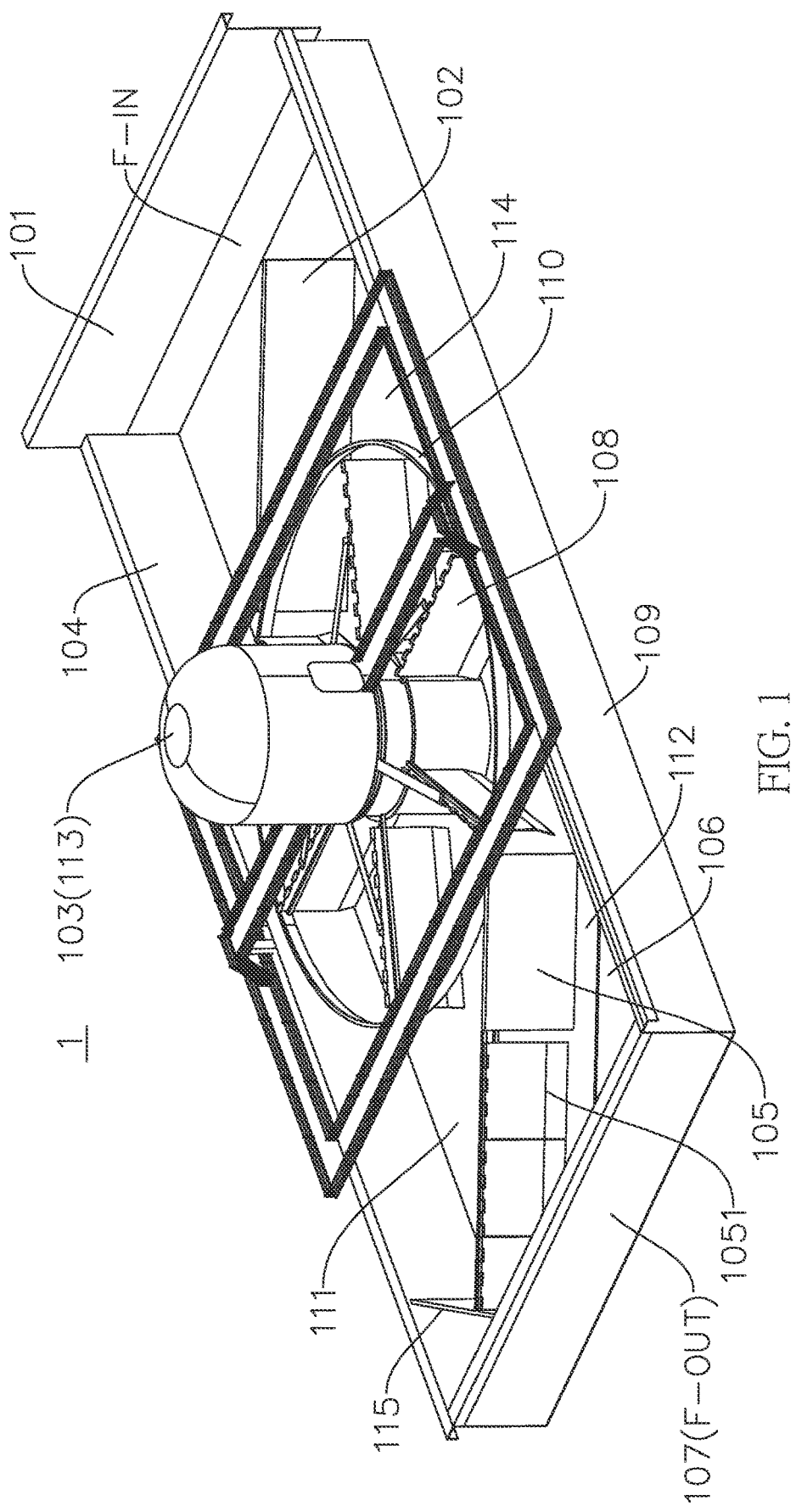
FIG. 1 is a three-dimensional diagram of a tidal power generation device according to a first embodiment of the present disclosure.

To understand the technical features, content and advantages of the present disclosure and its efficacy, the present disclosure will be described in detail with reference to the accompanying drawings. The drawings are for illustrative and auxiliary purposes only and may not necessarily be the true scale and precise configuration of the present disclosure. Therefore, the scope of the present disclosure should not be limited to the scale and configuration of the attached drawings.

The present disclosure provides a tidal power generation device, which comprises a container assembly and power generation device, wherein the power generation equipment is arranged in the container assembly. A water inlet of the container assembly is used to let the tidal water flow in, and an entrance guide plate of the container assembly will cause the water flow to move in the direction of the power generation device to push the thrust plates of the power generation device, thereby driving the power generation device's thrust plate traction mechanism to make a power generator of the power generation device convert kinetic energy into electrical energy. After the water flow pushes the thrust plates, it enters a pressure accumulating pool of the container assembly. Then, the water flow in the pressure accumulating pool flows to a backflow guide plate of the container assembly, and flows to a first pressure relief pool of the container assembly to continue pushing the thrust plates. Through the design of entrance guide plate and backflow guide plate, the direction of water flow can be effectively guided, and the effect of buffering excessive water flow thrust can be achieved, so as to avoid the technical problem of damage to the thrust plates.

In order to further prevent the excessive thrust of the water flow from damaging the thrust plates, in at least one of the embodiments, the optionally adopted manner is: (1) the backflow guide plate is further provided with a unidirectional valve to prevent the water flow from being damaged, when the water thrust is too large, the backflow guide plate directs the water flow of the pressure accumulating pool to the second pressure relief pool of the container assembly; (2) the container assembly is equipped with two or more water inlets and entrance guide plates to merge the water flows, and the entrance guide plate is equipped with a unidirectional valve to reduce the water flow thrust after confluence; (3) before the water flow of the water inlet reaches the thrust plates of the power generation device, it will be slowed down by the slope-like ascending guide plate; and/or (4) the thrust plate is pivotally connected to the damper, and when the thrust of the water flow is too large, the angle between the thrust plate and the horizontal plane is changed to allow all or part of the water flow to pass directly. After referring to the present disclosure, those with ordinary knowledge in the technical field to which the present disclosure belongs can selectively adopt at least one of the above-mentioned manners to combine with the aforementioned tidal power generation device. However, in the case that the material of the thrust plates is less susceptible to damage, those with ordinary knowledge in the technical field to which the present disclosure pertains may not adopt any of the above manners.

Figure 2A:
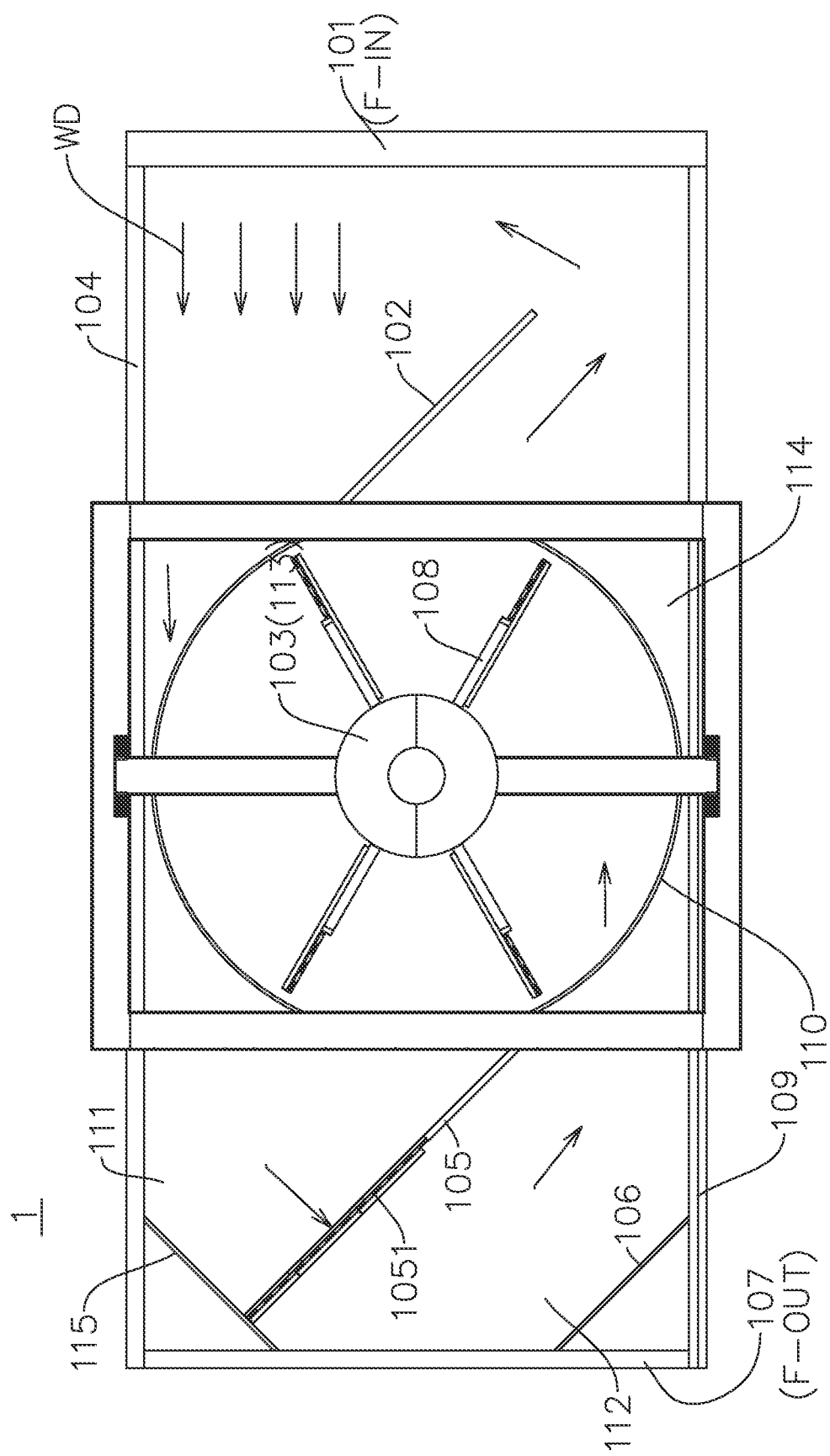
FIG. 2A is a top view diagram of a tidal power generation device according to a first embodiment of the present disclosure.

Next, other embodiments are used to illustrate more details of the present disclosure. Refer to FIG. 1 and FIG. 2A, FIG. 1 is a three-dimensional diagram of a tidal power generation device according to a first embodiment of the present disclosure, and FIG. 2A is a top view diagram of a tidal power generation device according to a first embodiment of the present disclosure. The tidal power generation device 1 includes a container assembly (formed by a bottom plate (not marked with a reference number), an inlet wave height adjustment plate 101, an entrance guide plate 102, ocean current side guide plates 104, 109, a backflow guide plate 105, backflow side guide plates 106, 115 and an outlet wave height adjustment plate 107) and a power generation device (composed of a power control room 103, multiple thrust plates 108, a thrust plate traction mechanism 110 and a power generator 113). The power generation device is accommodated in a container assembly, for example, between the left and right sides of the container assembly, and the power generation device can further have a frame ((not marked with a reference number, such as a square frame as shown in FIG. 1), so that the power generation device is engaged with or locked to the container assembly via the frame to fix the container assembly and power generation device.

The inlet wave height adjustment plate 101, the ocean current side guide plates 104, 109, and the outlet wave height adjustment plate 107 and the bottom plate generally form a rectangular container, and the container is equipped with the entrance guide plate 102, the backflow guide plate 105 and the backflow side guide plates 106 and 115 to constitute a container assembly. The inlet wave height adjustment plate 101 is located on the right side (first side) of the container assembly. The inlet wave height adjustment plate can be moved vertically to adjust the water inlet amount of the water flow WD of the water inlet F_IN, and restrict the water flow of excessively high waves from entering the container assembly. The ocean current side guide plates 104 and 109 are located on the upper side (second side) and the lower side (third side) of the container assembly, and connect the inlet wave height adjustment plate 101 and the outlet wave height adjustment plate 107. The outlet wave height adjustment plate 107 is located on the left side (fourth side) of the container assembly. The outlet wave height adjustment plate 107 can be moved vertically to adjust the water outlet amount of the water flow WD of the water outlet F_OUT and limit the water flow WD of the excessively high wave from entering and leaving the container assembly. The outlet wave height adjustment plate 107 and the water outlet F_OUT can be non-essential components of the present disclosure, and they can be replaced by a fixed ocean current side guide plate, or directly replaced by a backflow guide plate 105, and at this time the backflow guide plate 105 is also located on the left side (fourth side) of the container assembly.

The entrance guide plate 102 is diagonally disposed, and has an angle with the lateral extension direction of the container assembly (i.e., the normal line of the water inlet F_IN), and is disposed between the position where the power generation device is accommodated in the container assembly and the inlet wave height adjustment plate 101, and is further located between ocean current side guide plates 104 and 109 to guide the water flow WD to the thrust plates 108 of the power generation device. The backflow guide plate 105 is diagonally disposed, and has an angle with the lateral extension direction of the container assembly, and is disposed between the position where the container assembly accommodates the power generation device and the outlet wave height adjustment plate 107, and is further located between the ocean current side guide plate 104 and 109, so that the water flow WD that pushes the thrust plates 108 is redirected to the thrust plates 108 of the power generation device. The backflow side guide plate 115 is diagonally disposed, and has an angle with the lateral extension direction of the container assembly, and is connected between the backflow guide plate 105 and the ocean current side guide plate 104, so that the water flow WD can more easily flow to the thrust plates 108 of the power generation device. The backflow side guide plate 106 is diagonally disposed, and has an angle with the lateral extension direction of the container assembly, and is connected between the backflow guide plate 105 and the ocean current side guide plate 109 to allow the water flow WD to flow more easily to the thrust plates 108 of the power generation device. The backflow side guide plates 115 and 106 may be unnecessary elements in the present disclosure which can be removed.

The region surrounded by the position where the container assembly accommodates the power generation device, the outlet wave height adjustment plate 107, the ocean current side guide plate 104 and the backflow guide plate 105 defines the pressure accumulating pool 111 of the container assembly, and region surrounded by the position where the container assembly accommodates the power generation device, the outlet wave height adjustment plate 107, the ocean current side guide plate 109 and the backflow guide plate 105 defines the second pressure relief pool 112 of the container assembly. The region formed by the position where the container assembly accommodates the power generation device, the entrance guide plate 102 and the ocean current side guide plate 109 defines the first pressure relief pool 114 of the container assembly. In the first embodiment, the backflow guide plate 105 is further provided with at least one unidirectional valve 1051 to be opened when the water flow thrust is greater than a specific value (first specific value), so that the water flow WD of the pressure accumulating pool 111 flows to the second pressure relief pool 112, and the excessive water flow thrust is avoided to damage the thrust plates 108. When the water flow thrust is not too large (less than the specific value), the water flow WD of the pressure accumulating pool 111 will flow to the thrust plates 108 of the power generation device, and then to the first pressure relief pool 114. The water flow WD of the second pressure relief pool 112 can flow out of the container assembly through the water outlet F_OUT, or can flow to the thrust plates 108 of the power generation device, and then to the first pressure relief pool 114. The water flow WD of the first pressure relief pool 114 can partially merge with the water flow WD of the water inlet F_IN and continue to flow to the thrust plates 108 of the power generation device, or flow out of the container assembly through the water inlet F_IN.

The power control room 103 of the power generation device is composed of a waterproof housing, and the power generator 113 is installed in the power control room 103. A part of the power generator 113 will be connected to the thrust plate traction mechanism 110, and multiple thrust plates 108 will be connected to the thrust plate traction mechanism 110. The power control room 103 will be waterproof and sealed to avoid the situation that a part of the power generator 113 needs to be connected to the thrust plate traction mechanism 110 which will cause water to flow into the power generator 113. When the thrust plates 108 are pushed by the water flow WD, the thrust plates 108 drive the thrust plate traction mechanism 110 to rotate, thereby generating kinetic energy, and the power generator 113 converts the kinetic energy into electrical energy.

In this embodiment, the number of the thrust plates 108 is six, and they are arranged in a symmetrical manner. In other embodiments, the number of thrust plates 108 can also be three or more, or even the thrust plates 108 can be arranged asymmetrically. The present disclosure is not limited by the arrangement and quantity of the thrust plates 108. In addition, the thrust plates 108 can also be pivotally connected to the damper (for example, the damper 1081 in FIG. 4). When the water flow thrust is too large, the thrust plate 108 can change the angle between it and the horizontal plane to allow part or all of the water flow to pass directly without being resisted by thrust plates 108.

In the first embodiment, one end of the entrance guide plate 102 does not extend to one end of the inlet wave height adjustment plate 101, and one end of the ocean current side guide plate 109 extends to one end of the inlet wave height adjustment plate 101, so one end of inlet wave height adjustment plate 101 and one end of ocean current side guide plate 109 are in contact with each other, and the water flow WD of the first pressure relief pool 114 can partially merge with the water flow WD of water inlet F_IN and continue to flow to the thrust plates 108 of the power generation device, or to flow out of the container assembly through the water inlet F_IN. However, in other embodiments, the length of the entrance guide plate 102 can be adjusted, and the length of the ocean current side guide plate 109 can also be adjusted accordingly.

Figure 2B:
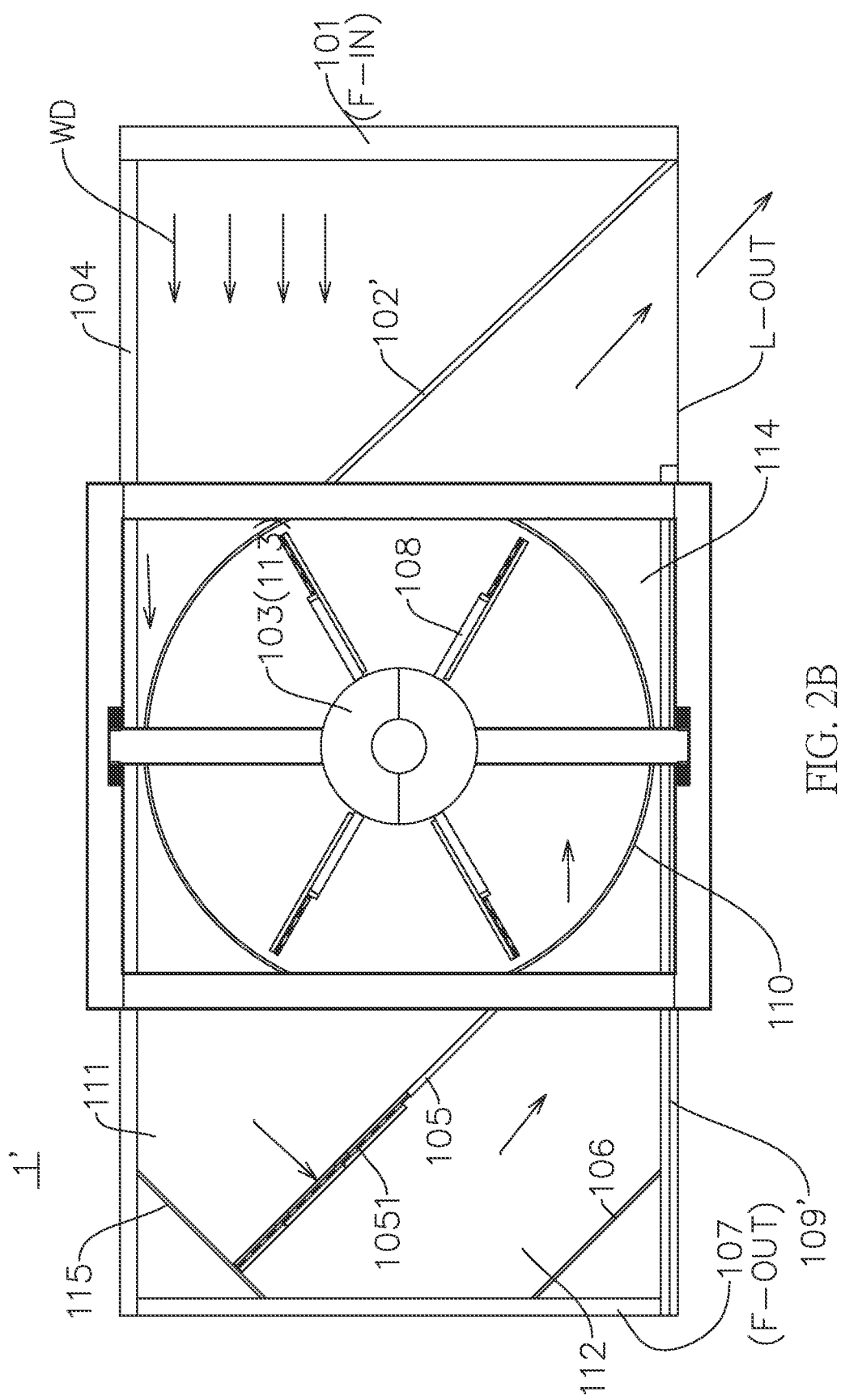
FIG. 2B is a top view diagram of a tidal power generation device according to a second embodiment of the present disclosure.

Refer to FIG. 2B, and FIG. 2B is a top view diagram of a tidal power generation device according to a second embodiment of the present disclosure. In the second embodiment of FIG. 2B, the length of the entrance guide plate 102' of the tidal power generation device 1' is longer than the length of the entrance guide plate 102 of the tidal power generation device 1, and one end of the entrance guide plate 102' extends and contacts the inlet wave height adjustment plate 101, and the length of ocean current side guide plate 109' is shorter than the length of ocean current side guide plate 109 of tidal power generation device 1, thereby forming another water outlet L_OUT. In this way, the water flow WD of the first pressure relief pool 114 will directly flow out of the container assembly through the water outlet L_OUT, and will not converge with the water flow coming from the water inlet F_IN, nor will it flow out of the container assembly through the water inlet F_IN, thus it will not cause interference, and it will increase power generation efficiency.

Figure 2C:
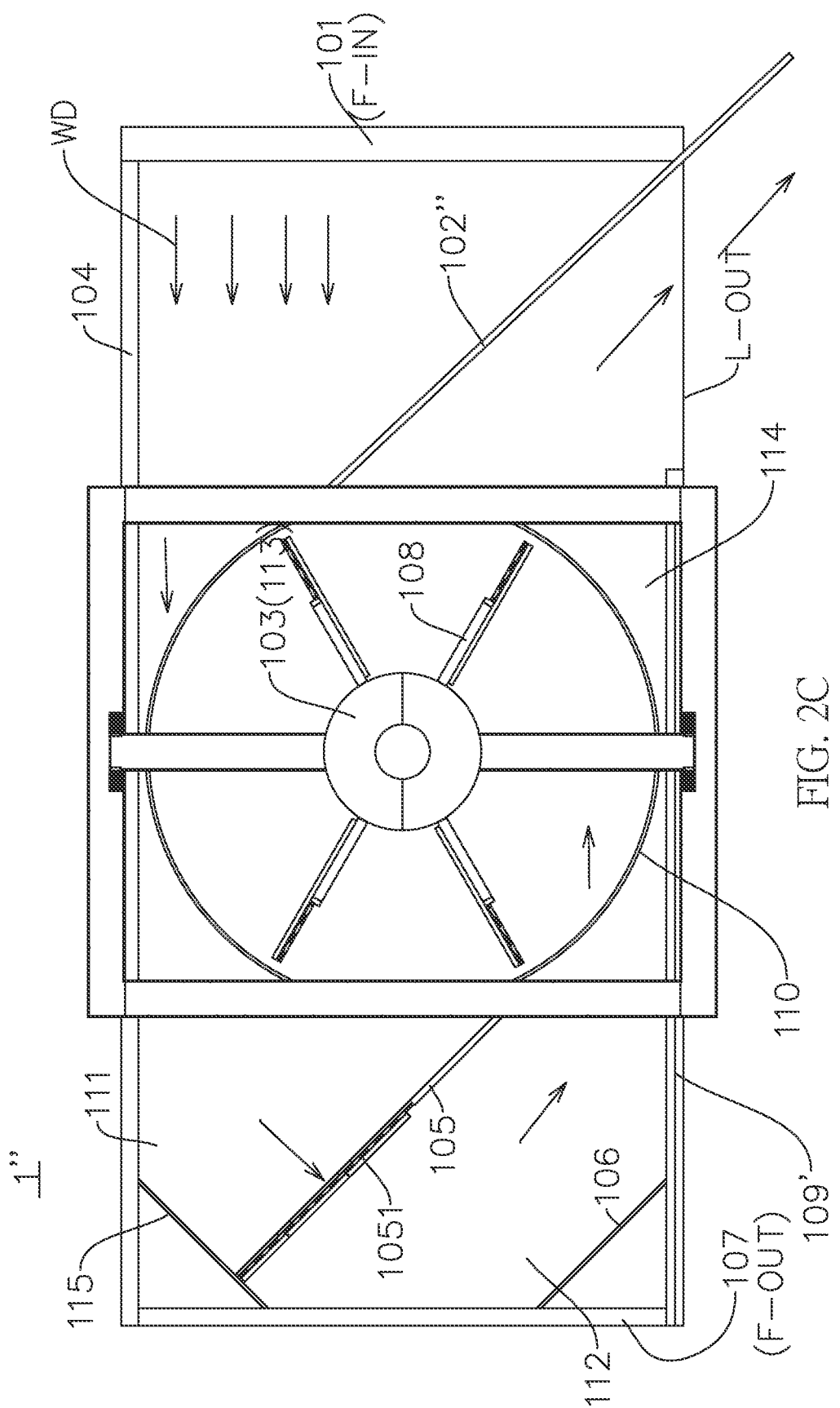
FIG. 2C is a top view diagram of a tidal power generation device according to a third embodiment of the present disclosure.

Refer to FIG. 2C, and FIG. 2C is a top view diagram of a tidal power generation device according to a third embodiment of the present disclosure. In the third embodiment shown in FIG. 2C, compared to the second embodiment, the entrance guide plate 102" of the tidal power generation device 1" has a longer length, and one end of the entrance guide plate 102" protrudes to the water outlet L_OUT and outside of inlet wave height adjustment plate 101. In the third embodiment, the entrance guide plate 102" can prevent the water flow flowing out of the container assembly through the water outlet L_OUT from interfering with the water flow entering the water inlet F_IN, so as to increase the power generation efficiency.

Figure 3:
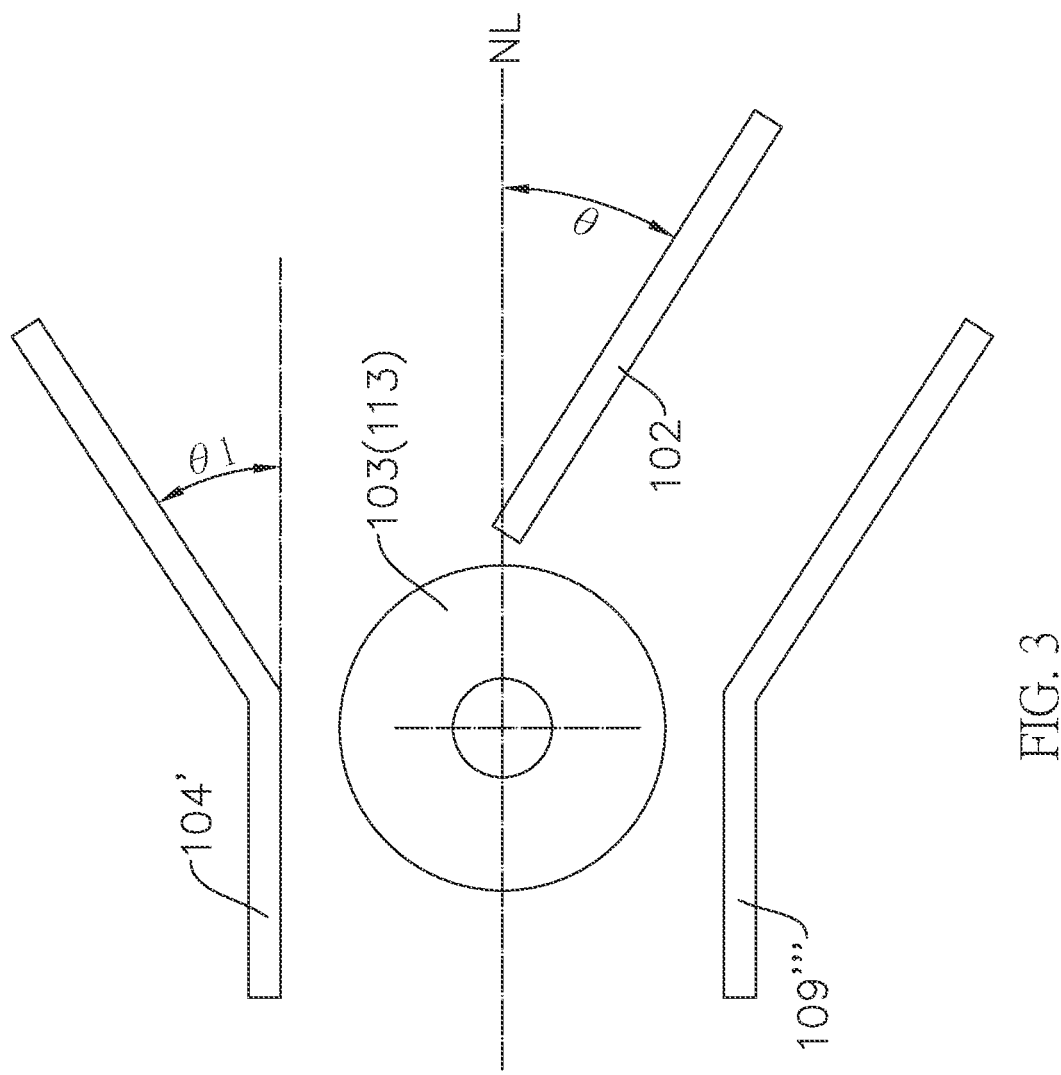
FIG. 3 is a schematic diagram showing an angle configuration of an entrance guide plate of a tidal power generation device according to a fourth embodiment of the present disclosure.

Refer to FIG. 3, and FIG. 3 is a schematic diagram showing an angle configuration of an entrance guide plate of a tidal power generation device according to a fourth embodiment of the present disclosure. In order to make the power generation efficiency of the tidal power generation device better, in the present disclosure, the angle θ between the normal line NL (that is, the lateral extension direction) of the water inlet and the entrance guide plate 102 can be selectively designed, and the angle θ1 between the normal line NL and the ocean current side guide plate 104' can be selectively designed, so as to make the sum of the angles θ and θ1 be between 60 degrees and 120 degrees (including 60 degrees and 120 degrees), wherein the angles θ and θ1 can be between 15 degrees and 60 degrees (including 15 degrees and 60 degrees), as long as the sum of the angles θ and θ1 is between 60 degrees and 120 degrees, the power generation efficiency can be better. In addition, the angle of the ocean current side guide plate 109''' and the normal line NL of the water inlet does not need to be restricted.

Figure 4:
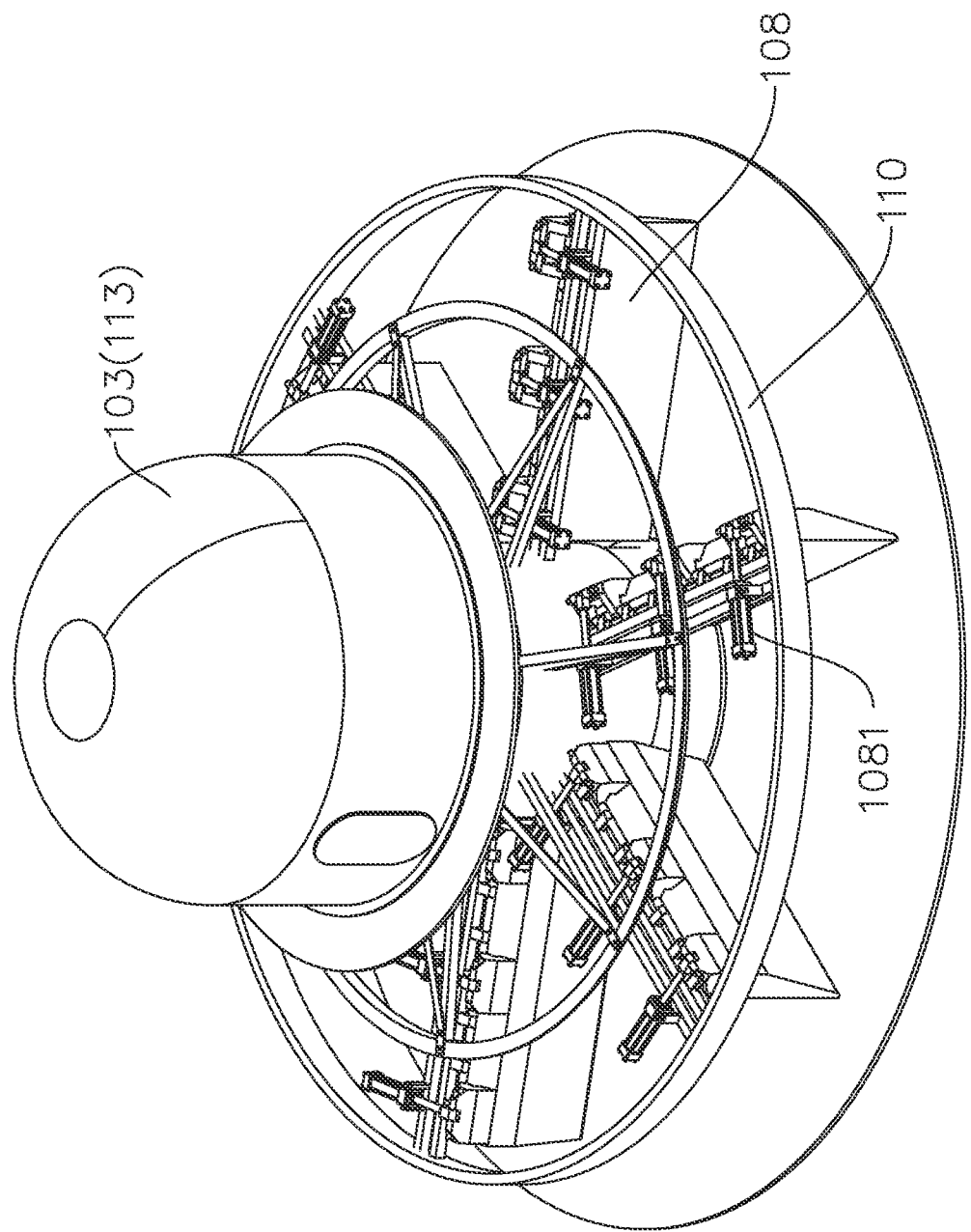
FIG. 4 is a three-dimensional diagram of a power generation device in a tidal power generation device according to arbitrary one embodiment of the present disclosure.
Figure 5:
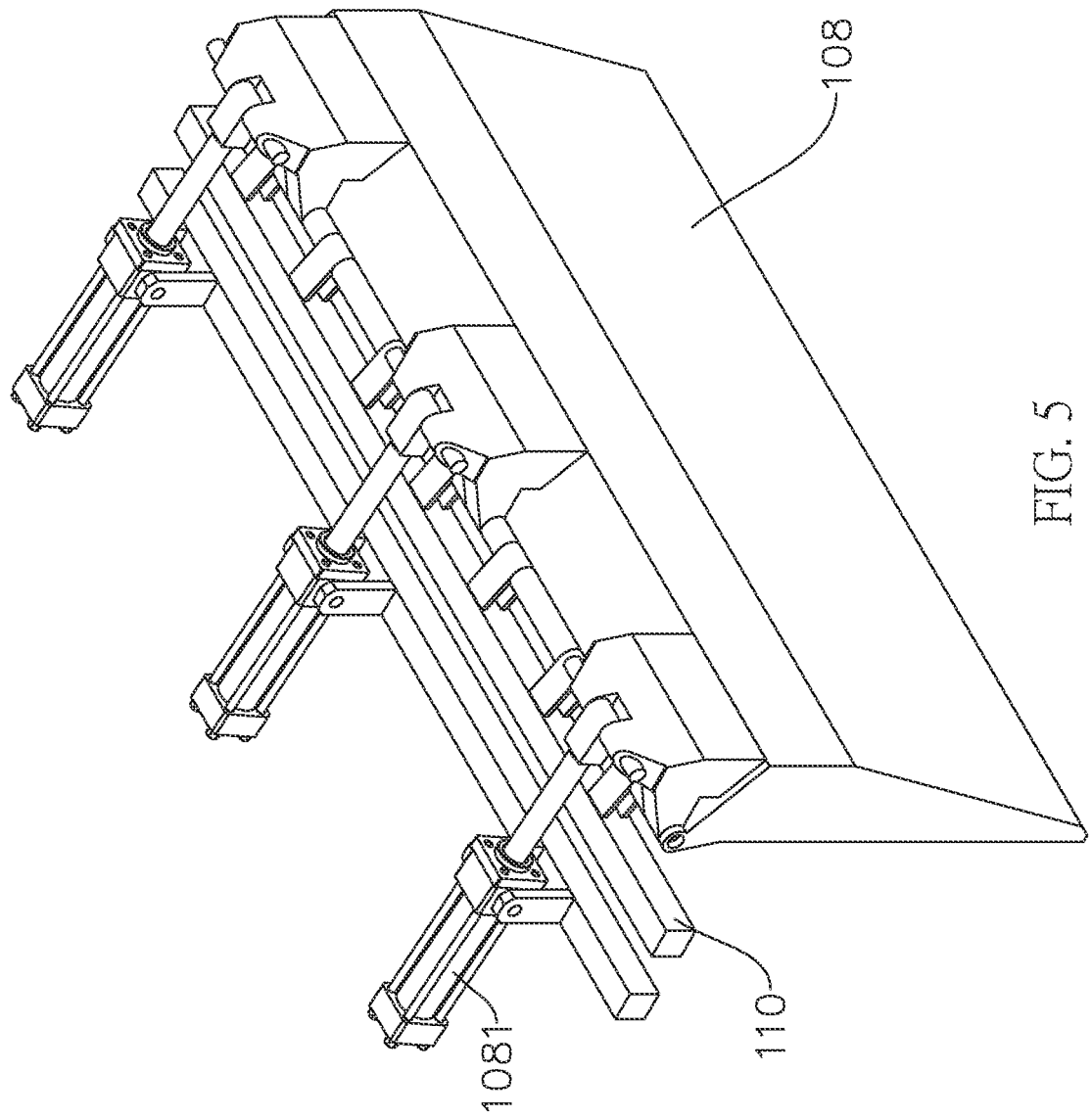
FIG. 5 is a three-dimensional diagram of a thrust plate in a tidal power generation device according to arbitrary one embodiment of the present disclosure.
Figure 6:
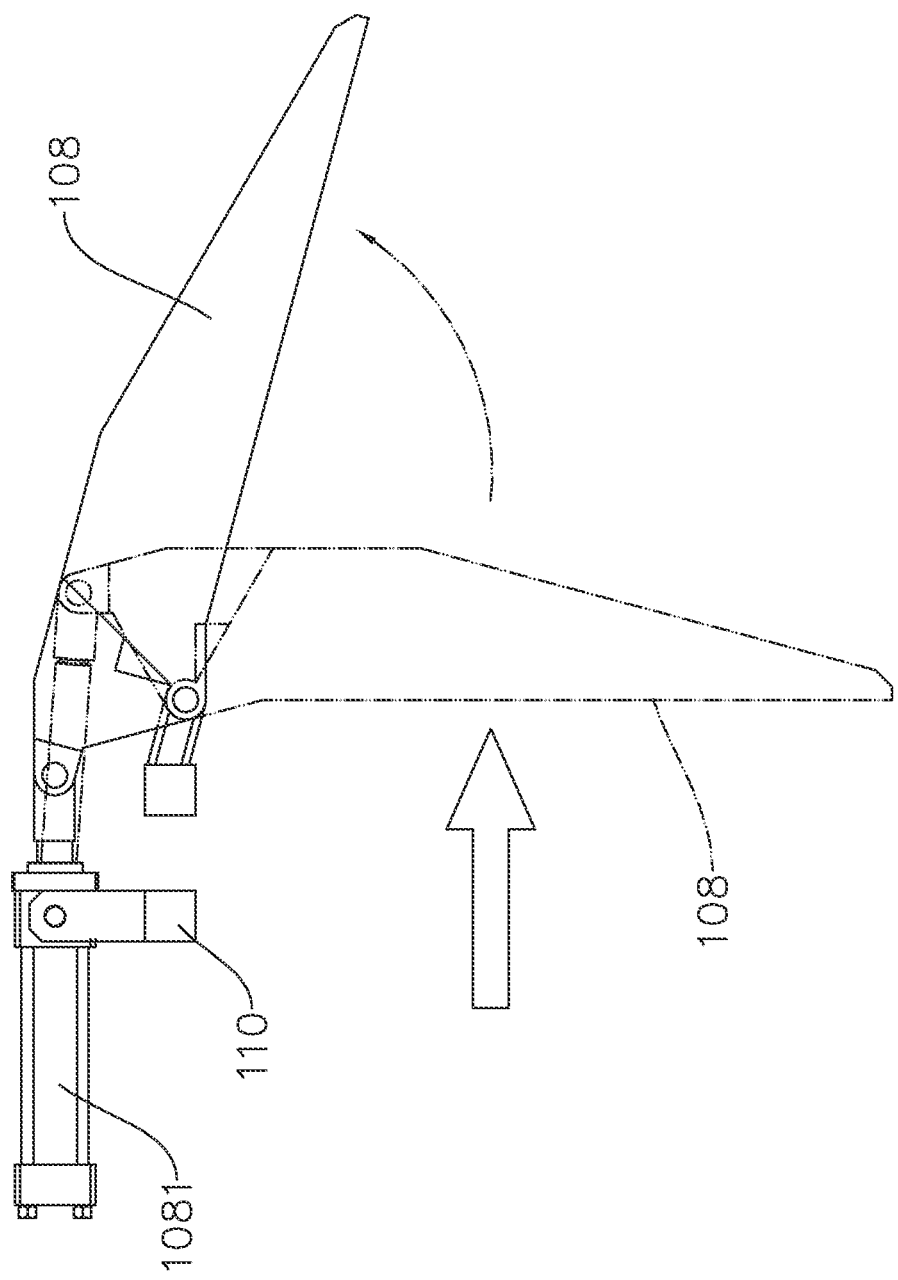
FIG. 6 is a schematic diagram showing an angle variation of a thrust plate of a tidal power generation device according to arbitrary one embodiment of the present disclosure.

Refer to FIG. 4 through FIG. 6, FIG. 4 is a three-dimensional diagram of a power generation device in a tidal power generation device according to arbitrary one embodiment of the present disclosure, FIG. 5 is a three-dimensional diagram of a thrust plate in a tidal power generation device according to arbitrary one embodiment of the present disclosure, and FIG. 6 is a schematic diagram showing an angle variation of a thrust plate of a tidal power generation device according to arbitrary one embodiment of the present disclosure. One end of each of the thrust plates 108 of the power generation device is pivotally connected to at least one damper 1081 (in FIG. 4 and FIG. 5, there are multiple dampers 1081), and the damper 1081 is, for example, a hydraulic damper, but it is not limited thereto. One end of the damper 1081 is locked to a part of the thrust plate traction mechanism 110 (as shown in FIG. 4 and FIG. 5), so that when the thrust plate 108 is less than a specific value in the water flow, the angle between the thrust plate 108 and the horizontal plane is 90 degrees to receive water flow thrust, thereby driving the thrust plate traction mechanism 110 to rotate (in this embodiment, the direction of rotation is counterclockwise). When the water flow thrust is greater than the specific value, the angle between the thrust plate 108 and the horizontal plane will change, and the change of angle will be related to the water flow thrust. For example, in FIG. 6, the angle between the thrust plate 108 and the horizontal plane becomes almost 0 degree (this angle is not used to limit the present invention) from 90 degrees.

Figure 7:
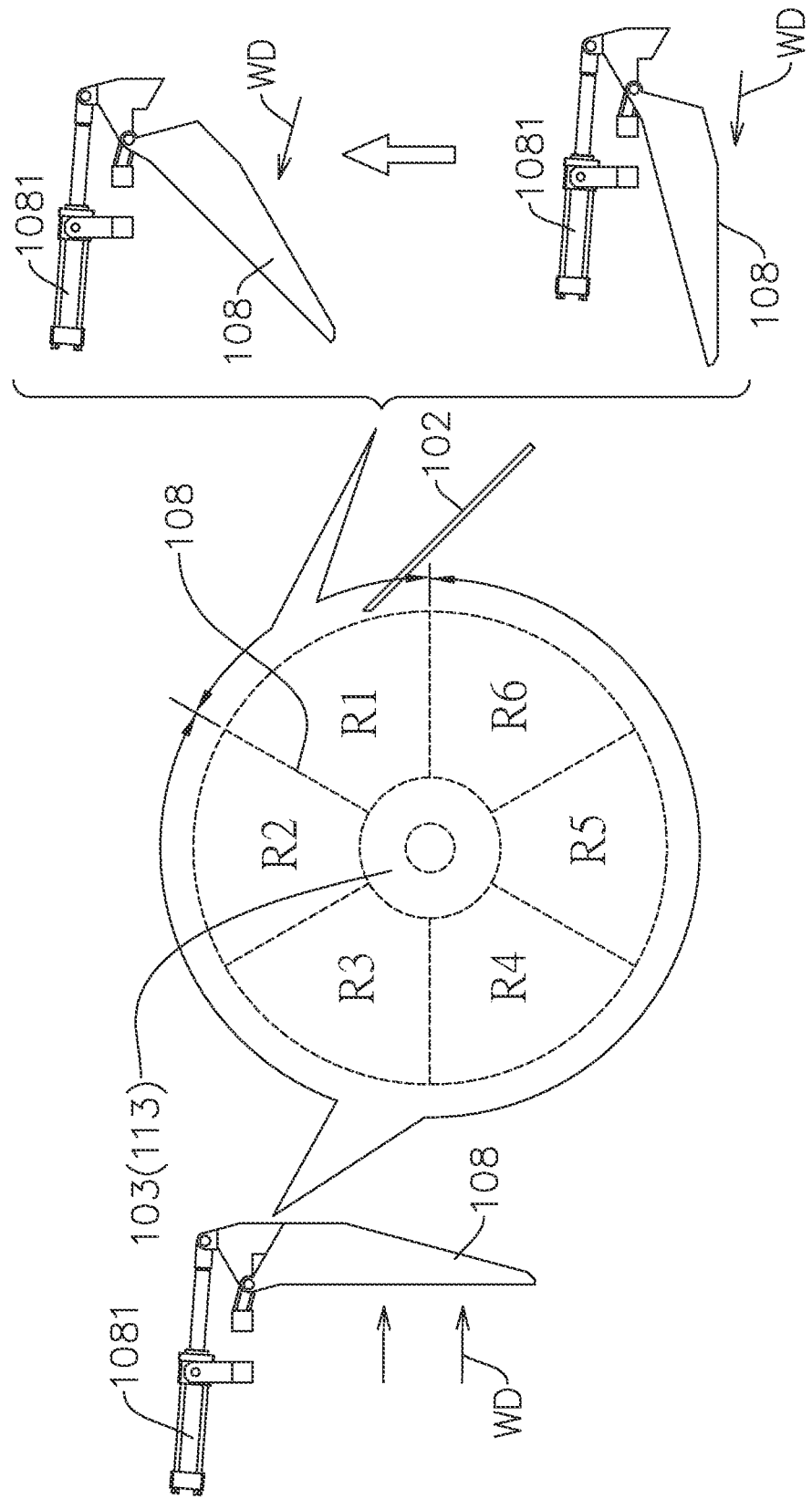
FIG. 7 is a schematic diagram showing an angle variation of a thrust plate of a tidal power generation device in different locations according to arbitrary one embodiment of the present disclosure.

See FIG. 7, and FIG. 7 is a schematic diagram showing an angle variation of a thrust plate of a tidal power generation device in different locations according to arbitrary one embodiment of the present disclosure. In FIG. 7, from one end corresponding to the entrance guide plate 102 to a counterclockwise direction, the circular region formed by the six thrust plates 108 is sequentially divided into six regions R1 to R6. The water flow thrust of each of the regions R2 to R6 is generally less than the specific value, so when the thrust plate 108 is in one of the regions R2 to R6, the angle between the thrust plate 108 and the horizontal plane is mostly 90 degrees (such as the thrust plate 108 shown on the left side of FIG. 7). The water flow thrust of the region R1 is generally greater than the specific value, and the closer the water flow thrust is to the region R2, the smaller it will be. Therefore, in the region R1, the thrust plate 108 moves from closer to region R6 to closer to the region R2, and the angle between the thrust plate 108 and the horizontal plane gradually increases from almost 0 degrees (such as the thrust plate 108 shown on the right side of FIG. 7). In other words, each of the thrust plates 108 is pivotally connected to at least one damper 1081 to change the angle between the thrust plate 108 and a horizontal plane when the water flow thrust is greater than a second specific value. In this way, through the use of the dampers 1081, the tidal power generation device of the embodiment of the present disclosure can more effectively avoid damage to the thrust plates 108 due to excessive water flow thrust, and can maintain certain power generation efficiency. When the water flow thrust is too large, the angle between all the thrust plates 108 and the horizontal planes does not change to almost 0 degrees, so that the thrust plate traction mechanism 110 will not rotate hardly, and the power generation efficiency will not be reduced.

Figure 8:
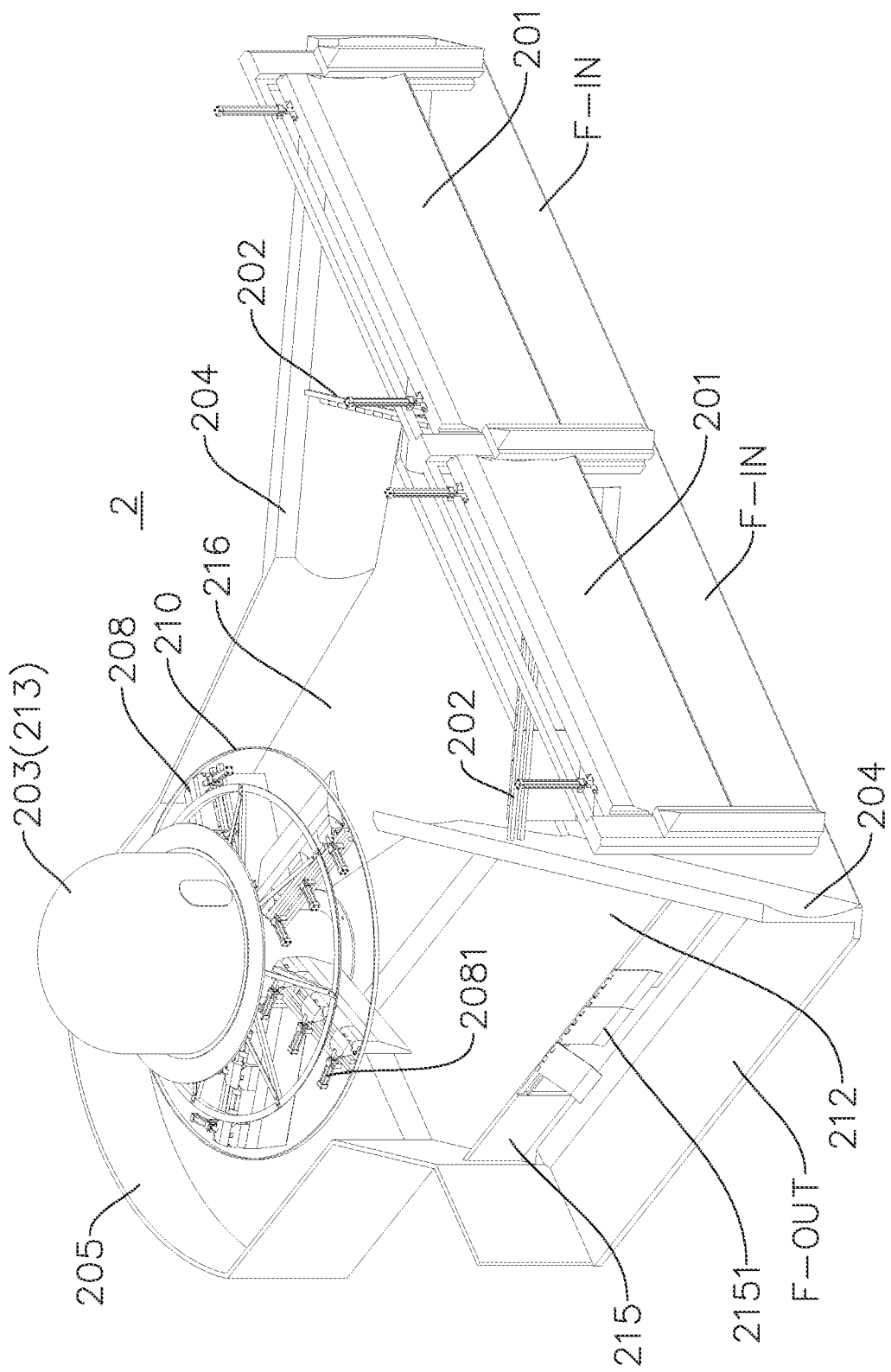
FIG. 8 is a three-dimensional diagram of a tidal power generation device according to a fifth embodiment of the present disclosure.
Figure 9:
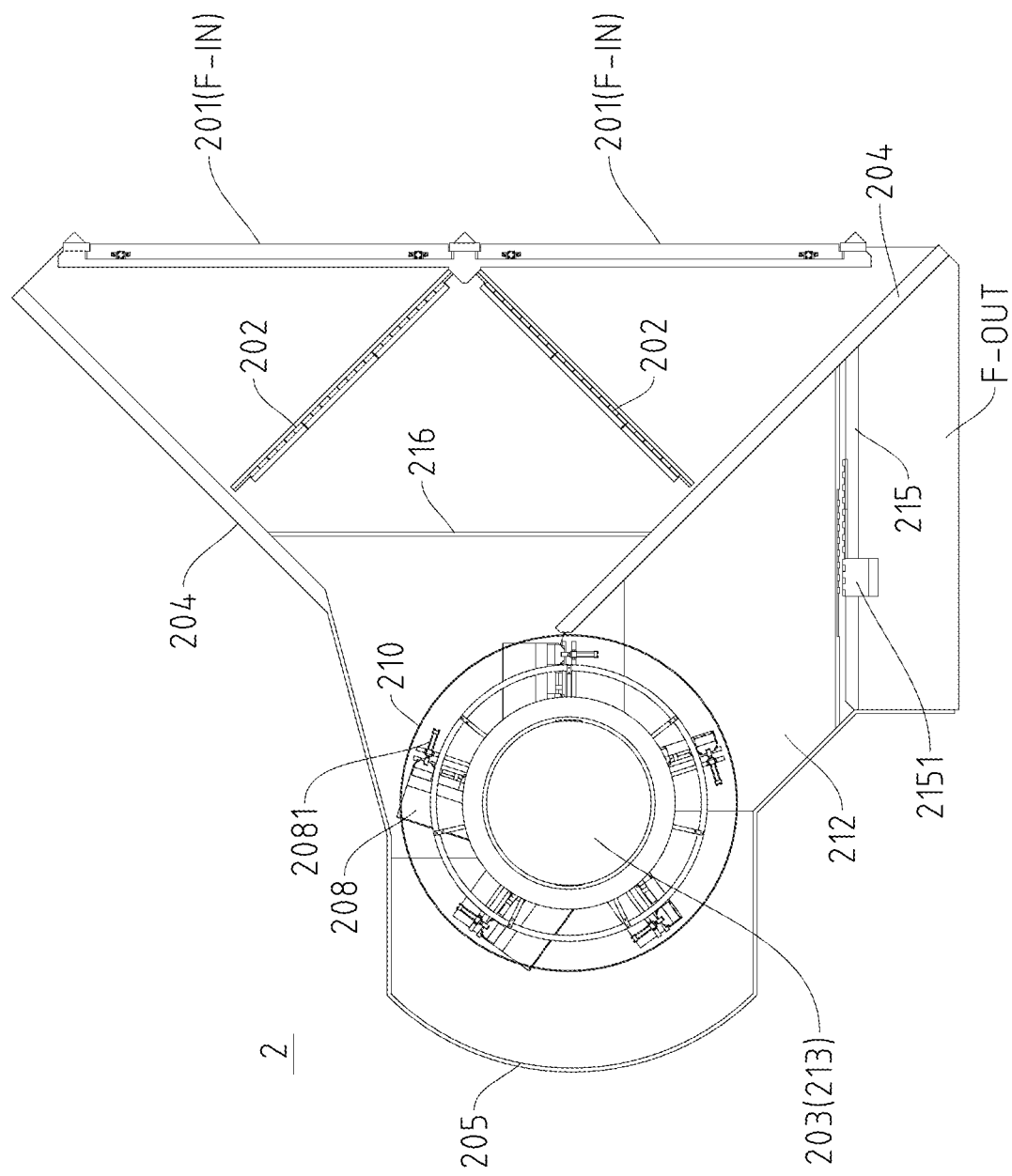
FIG. 9 is a top view diagram of a tidal power generation device according to a fifth embodiment of the present disclosure.
Figure 10:
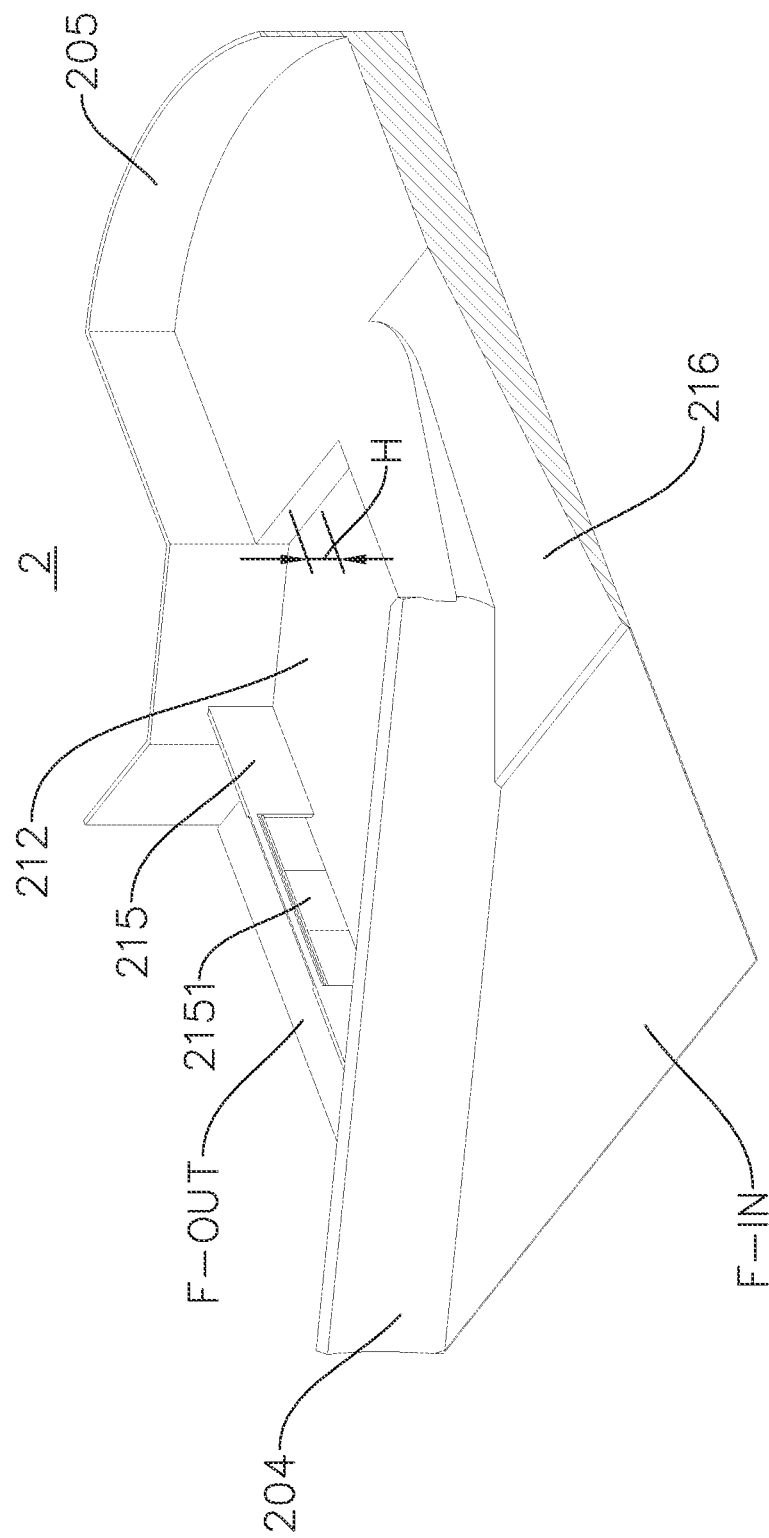
FIG. 10 is a sectional view of partials of a tidal power generation device according to a fifth embodiment of the present disclosure.

Refer to FIG. 8 through FIG. 10, FIG. 8 is a three-dimensional diagram of a tidal power generation device according to a fifth embodiment of the present disclosure, FIG. 9 is a top view diagram of a tidal power generation device according to a fifth embodiment of the present disclosure, and FIG. 10 is a sectional view of partials of a tidal power generation device according to a fifth embodiment of the present disclosure. In the fifth embodiment, the tidal power generation device 2 includes a container assembly (consisting of a bottom plate (not marked with a reference number in the drawings), two inlet wave height adjustment plates 201, two entrance guide plates 202, two ocean current side guide plates 204, a backflow guide plate 205, a backflow exit gate plate 215 and a ramp-shaped ascending guide plate 216) and a power generation device (consisting of a power control room 203, multiple thrust plates 208, multiple dampers 2081, a thrust plate traction mechanism 210 and a power generator 213). The inlet wave height adjustment plate 201 is located on the first side of the container assembly, and two ocean current side guide plates 204 are located on the second side and the third side of the container assembly, and the first side is adjacent to the second side and the third side. The backflow guide plate 205 is located on the fourth side of the container assembly, and between the two ocean current side guide plates 204, wherein the first side is facing the fourth side. The power generation device is contained in a container assembly, for example, between the left side (fourth side) and the right side (first side) of the container assembly.

The two inlet wave height adjustment plates 201, the two ocean current side guide plates 204, the backflow guide plate 205, the backflow exit gate plate 215 and the bottom plate roughly form a container that tapers from the right to the left, and the container is configured with two entrance guide plate 202 and an ascending guide plate 216 to form the container assembly. Two inlet wave height adjustment plates 201 are located on the right side of the container assembly and connected to each other. The inlet wave height adjustment plate 201 can be moved vertically to adjust the water inlet amount of the water flow WD of the water inlet F_IN, and restrict the water flow of the excessively high wave from entering the container assembly. Two ocean current side guide plates 204 are disposed diagonally, one end of each of the two ocean current side guide plates 204 corresponds to one end of each of the two entrance guide plates 202, the other end of each of the two ocean current side guide plates 204 extends toward the power generation device, and the other end of one ocean current side guide plate 204 is connected to the backflow guide plate 205. Simply put, as shown in FIG. 9, one of the ocean current side guide plates 204 extends from one end of the inlet wave height adjustment plate 201 on the lower right side to the upper left, and the other end of the ocean current side guide plate 204 is floating. Other one of the ocean current side guide plates 204 extends from one end of the inlet wave height adjustment plate 201 on the upper right side to the lower left, and the other end of the other one ocean current side guide plate 204 is connected to the backflow guide plate 205.

As shown in FIG. 9, the two entrance guide plates 202 are diagonally disposed in the container assembly. One end of one entrance guide plate 202 is connected to the junction of two inlet wave height adjustment plates 201, and extends from this junction to the upper left to connect to one of the ocean current side guide plate 204; one end of the other entrance guide plate 202 is connected to the junction of two inlet wave height adjustment plates 201, and extends from the junction to the lower left to connect to the other ocean current side guide plate 204. Both entrance guide plates 202 are provided with unidirectional valves (not marked with a reference number) on them, so that when the water flow thrust is too large, the water flow thrust can be slowed down, and the water flow with too little water flow thrust can be prevented from passing through the entrance guide plate 202. As shown in FIG. 9, The ascending guide plate 216 is arranged between the power generation device and the two entrance guide plates 202, and is used to reduce the water flow thrust of the water flow passing through the entrance guide plate 202, so as to avoid excessive water flow thrust that would damage the thrust plates 208 of the power generation device. In other words, each of the two entrance guide plates 202 has at least one unidirectional valve, so that when the water flow thrust is greater than a third specific value, the water flow WD flows to the thrust plates 208 through the unidirectional valve. As shown in FIG. 10, the ascending guide plate 216 is ramp-shaped, so it can reduce the water flow thrust.

As shown in FIG. 8 through FIG. 10, the backflow guide plate 205 has an arc shape to guide the water flow from the ascending guide plate 216 through the power generation device to the thrust plates 208 of the power generation device. Two ends of the backflow guide plate 205 are respectively connected to one of the ocean current side guide plate 204 and the backflow exit gate plate 215, and the backflow exit gate plate 215 is also connected to the other of the ocean current side guide plate 204. One side of the backflow exit gate plate 215 is defined as water outlet F_OUT, and the other side of the backflow exit gate plate 215, the other ocean current side guide plate 204 and the position wherein the container assembly contains the power generation device defines the pressure relief pool 212. When the water flow thrust of the pressure relief pool is greater than a specific value, the unidirectional valve 2151 provided on the backflow exit gate plate 215 will be opened, so that the water flow thrust of the pressure relief pool 212 will not be too large. In other words, the backflow exit gate plate 215 has at least one unidirectional valve 2151 to allow the water flow WD to flow out of the water outlet F_OUT of the container assembly when the water flow thrust is greater than a fourth specific value. Please refer to FIG. 10, it is noted that the height of the position where the container assembly contains the power generation device will be greater than the height of the pressure relief pool (such as the height difference H in FIG. 10) to allow the water flow guided by the backflow guide plate 205 is easier to push the thrust plates 208.

Specifically, the container assembly of the tidal power generation device of the present disclosure can effectively guide the direction of the water flow through the design of the entrance guide plate and the backflow guide plate, and produce the effect of buffering excessive water flow thrust, so as to avoid the technical problem of damage to the thrust plates of the power generation device. In addition, in other embodiments, in order to further improve the power generation efficiency and avoid the probability of damage to the thrust plate, at least one of the following technical features can be selectively used: (1) the backflow guide plate is further provided with a unidirectional valve; (2)) the container assembly is equipped with two or more water inlets and entrance guide plates, and the entrance guide plate is equipped with a unidirectional valve; (3) an ascending guide plate in the region before the water flow of the water inlet reaches the thrust plate of the power generation device is provided; and (4) the thrust plate is pivotally connected to the damper to change the angle between the thrust plate and the horizontal plane according to the resistance of the water flow.

To sum up, the tidal power generation device and its container assembly of the present disclosure are indeed disclosed by the descriptions of different embodiments, and the tidal power generation device and its container assembly in one of the embodiments can achieve the desired result(s). Furthermore, the tidal power generation device and its container assembly of the present disclosure are not anticipated and obtained by the prior art, and the present disclosure complies with the provision of the patent act. The present disclosure is applied according to the patent act, and the examination and allowance requests are solicited respectfully.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A tidal power generation device, comprising:
   a container assembly, at least comprising an inlet wave height adjustment plate, at least an entrance guide plate, two ocean current side guide plates and a backflow guide plate, wherein the inlet wave height adjustment plate is disposed on a first side of the container assembly, the two ocean current side guide plates are respectively disposed on a second side and a third side of the container assembly, the first side is disposed adjacent to the second side and the third side, the backflow guide plate is disposed on a fourth side of the container assembly and disposed between the two ocean current side guide plates, the first side faces the fourth side, and the entrance guide plate is diagonally disposed in the container assembly;
   a power generation device, comprising thrust plates, wherein the power generation device is disposed between the first side and the fourth side and disposed on one side of the entrance guide plate;
   wherein the inlet wave height adjustment plate is able to move vertically to adjust a water inlet amount of a water flow of a water inlet associated with the container assembly, the entrance guide plate is used to guide the water flow to push the thrust plates, the backflow guide plate is used to guide the water flow that pushes the thrust plates to push the thrust plates again, and a region formed by a position which the container assembly accommodates the power generation device, the entrance guide plate and the ocean current side guide plate defines a first pressure relief pool of the container assembly;
   wherein the power generation device has multiple dampers, and each of the thrust plates is pivotally connected to the at least one damper, so that when a water flow thrust of a pressure accumulating pool defined between the backflow guide plate, the position of the power generation device and the second side is greater than a first specific value, an angle between the thrust plate and a horizontal plane is changed.

2. The tidal power generation device of claim 1, wherein the backflow guide plate is provided with at least one unidirectional valve, and when the water flow thrust of a pressure accumulating pool defined between the backflow guide plate, the position of the power generation device and the second side is greater than a second specific value, the unidirectional valve is turned on to guide the water flow of the pressure accumulating pool to a second pressure relief pool defined between the backflow guide plate, the position of the power generation device and the third side; the container assembly further comprises two backflow side guide plates, one of the backflow side guide plate is diagonally disposed between the second side and the backflow guide plate, and the other one backflow side guide plate is diagonally disposed between the third side and the backflow guide plate; the container assembly further comprises an outlet wave height adjustment plate disposed on a side of the backflow guide plate that is not facing the power generation device and disposed between the second side and the third side, and the outlet wave height adjustment plate is used to move vertically to adjust a water outlet amount of the water flow of a water outlet associated with the container assembly.

3. The tidal power generation device of claim 2, wherein a summation of a first angle and a second angle is between 60 and 120 degrees, the first angle is formed between the entrance guide plate and a normal line of the water inlet of the container assembly, and the second angle is formed between the ocean current side guide plate of the second side and the normal line.

4. The tidal power generation device of claim 2, wherein one end of the entrance guide plate does not contact the inlet wave height adjustment plate and the ocean current side guide plate of the third side.

5. The tidal power generation device of claim 2, wherein one end of the entrance guide plate contacts the inlet wave height adjustment plate, and the ocean current side guide plate of the third side does not contact the inlet wave height adjustment plate, thereby forming another water outlet of the container assembly.

6. The tidal power generation device of claim 2, wherein one end of the entrance guide plate contacts the inlet wave height adjustment plate, and protrudes out of the inlet wave height adjustment plate, and the ocean current side guide plate of the third side does not contact the inlet wave height adjustment plate, thereby forming another water outlet of the container assembly, wherein the entrance guide plate is protruding beyond the other one water outlet.

7. The tidal power generation device of claim 1, wherein the at least one inlet wave height adjustment plate comprises two inlet wave height adjustment plates, the at least one entrance guide plate comprises two entrance guide plates, and the two inlet wave height adjustment plates are located on the first side, the two entrance guide plates are diagonally disposed in the container assembly, and each of the two entrance guide plates has at least one unidirectional valve, so that when the water flow thrust is greater than a second specific value, the water flow flows to the thrust plates through the unidirectional valve; the container assembly further comprises an ascending guide plate being ramp-shaped, and the ascending guide plate is arranged between the position of the power generation device and the two entrance guide plates.

8. The tidal power generation device of claim 7, wherein the container assembly further comprises a backflow exit gate plate, the backflow exit gate plate is disposed between the backflow guide plate and the ocean current side guide plate on the third side, the backflow exit gate plate has the at least one unidirectional valve, so that when the water flow thrust is greater than a third specific value, the water flow flows out of a water outlet of the container assembly; a height of the position of the power generation device is greater than a height of a pressure relief pool which is defined between the backflow exit gate plate, the position of the power generation device and the ocean current side guide plate on the third side.

9. A container assembly used in a tidal power generation device, for accommodating a power generation device of the tidal power generation device, and comprising at least an inlet wave height adjustment plate, at least an entrance guide plate, two ocean current side guide plates and a backflow guide plate, wherein the inlet wave height adjustment plate is disposed on a first side of the container assembly, the two ocean current side guide plates are respectively disposed on a second side and a third side of the container assembly, the first side is disposed adjacent to the second side and the third side, the backflow guide plate is disposed on a fourth side of the container assembly and disposed between the two ocean current side guide plates, the first side faces the fourth side, and the entrance guide plate is diagonally disposed in the container assembly;

wherein the power generation device comprises multiple thrust plates, wherein the power generation device is disposed between the first side and the fourth side and disposed on one side of the entrance guide plate;

wherein the inlet wave height adjustment plate is able to move vertically to adjust a water inlet amount of a water flow of a water inlet associated with the container assembly, the entrance guide plate is used to guide the water flow to push the thrust plates, the backflow guide plate is used to guide the water flow that pushes the thrust plates to push the thrust plates again, and a region formed by a position which the container assembly accommodates the power generation device, the entrance guide plate and the ocean current side guide plate defines a first pressure relief pool of the container assembly; the backflow guide plate is provided with at least one unidirectional valve, and when a water flow thrust of a pressure accumulating pool defined between the backflow guide plate, the position of the power generation device and the second side is greater than a first specific value, the unidirectional valve is turned on to guide the water flow of the pressure accumulating pool to a second pressure relief pool defined between the backflow guide plate, the position of the power generation device and the third side.

10. The container assembly of claim 9, wherein the container assembly further comprises two backflow side guide plates, one of the backflow side guide plate is diagonally disposed between the second side and the backflow guide plate, and the other one backflow side guide plate is diagonally disposed between the third side and the backflow guide plate; the container assembly further comprises an outlet wave height adjustment plate disposed on a side of the backflow guide plate that is not facing the power generation device and disposed between the second side and the third side, and the outlet wave height adjustment plate is used to move vertically to adjust a water outlet amount of the water flow of a water outlet associated with the container assembly.

11. The container assembly of claim 9, wherein a summation of a first angle and a second angle is between 60 and 120 degrees, the first angle is formed between the entrance guide plate and a normal line of the water inlet of the container assembly, and the second angle is formed between the ocean current side guide plate of the second side and the normal line.

12. The container assembly of claim 9, wherein one end of the entrance guide plate does not contact the inlet wave height adjustment plate and the ocean current side guide plate of the third side.

13. The container assembly of claim 9, wherein one end of the entrance guide plate contacts the inlet wave height adjustment plate, and the ocean current side guide plate of the third side does not contact the inlet wave height adjustment plate, thereby forming another water outlet of the container assembly.

14. The container assembly of claim 9, wherein one end of the entrance guide plate contacts the inlet wave height adjustment plate, and protrudes out of the inlet wave height adjustment plate, and the ocean current side guide plate of the third side does not contact the inlet wave height adjustment plate, thereby forming another water outlet of the container assembly, wherein the entrance guide plate is protruding beyond the other one water outlet.

15. A container assembly used in a tidal power generation device, for accommodating a power generation device of the tidal power generation device, and comprising at least an inlet wave height adjustment plate, at least an entrance guide plate, two ocean current side guide plates and a backflow guide plate, wherein the inlet wave height adjustment plate is disposed on a first side of the container assembly, the two ocean current side guide plates are respectively disposed on a second side and a third side of the container assembly, the first side is disposed adjacent to the second side and the third side, the backflow guide plate is disposed on a fourth side of the container assembly and disposed between the two ocean current side guide plates, the first side faces the fourth side, and the entrance guide plate is diagonally disposed in the container assembly;

wherein the power generation device comprises multiple thrust plates, wherein the power generation device is disposed between the first side and the fourth side and disposed on one side of the entrance guide plate;

wherein the inlet wave height adjustment plate is able to move vertically to adjust a water inlet amount of a water flow of a water inlet associated with the container assembly, the entrance guide plate is used to guide the water flow to push the thrust plates, the backflow guide plate is used to guide the water flow that pushes the thrust plates to push the thrust plates again;

the at least one inlet wave height adjustment plate comprises two inlet wave height adjustment plates, wherein the at least one entrance guide plate comprises two entrance guide plates, and the two inlet wave height adjustment plates are located on the first side, the two entrance guide plates are diagonally disposed in the container assembly, and each of the two entrance guide plates has at least one unidirectional valve, so that when the water flow thrust is greater than a first specific value, the water flow flows to the thrust plates through the unidirectional valve.

16. The container assembly of claim 15, wherein the container assembly further comprises an ascending guide plate being ramp-shaped, and the ascending guide plate is arranged between the position of the power generation device and the two entrance guide plates.

17. The container assembly of claim 16, wherein the container assembly further comprises a backflow exit gate plate, the backflow exit gate plate is disposed between the backflow guide plate and the ocean current side guide plate on the third side, the backflow exit gate plate has the at least one unidirectional valve, so that when the water flow thrust is greater than a second specific value, the water flow flows out of a water outlet of the container assembly.

18. The container assembly of claim 17, wherein a height of the position of the power generation device is greater than a height of a pressure relief pool which is defined between the backflow exit gate plate, the position of the power generation device and the ocean current side guide plate on the third side.

* * * * *